United States Patent [19]

Chen

[11] Patent Number: 5,669,289

[45] Date of Patent: Sep. 23, 1997

[54] STRAINER ASSEMBLY

[76] Inventor: Tse-Hsiung Chen, P.O. Box 82-144, Taipei, Taiwan

[21] Appl. No.: 777,095

[22] Filed: Dec. 30, 1996

[51] Int. Cl.$^6$ .................................................. A23N 1/02
[52] U.S. Cl. ............................. 99/511; 99/509; 99/513
[58] Field of Search ......................... 99/495, 509–513, 99/403, 407, 410–418; 34/58; 210/360.1, 380.1; 241/36, 92, 282.2

[56] References Cited

U.S. PATENT DOCUMENTS

| | | | |
|---|---|---|---|
| 3,885,321 | 5/1975 | Fouineteau | 34/58 |
| 4,078,481 | 3/1978 | Wunderlin | 99/511 |
| 4,209,916 | 7/1980 | Doyel | 99/495 X |
| 4,626,352 | 12/1986 | Massey et al. | 99/513 X |
| 4,643,085 | 2/1987 | Bertocchi | 99/510 |
| 4,688,478 | 8/1987 | Williams | 241/92 X |
| 5,071,077 | 12/1991 | Arroubi et al. | 99/511 X |
| 5,156,084 | 10/1992 | Lin | 210/380.1 |
| 5,289,763 | 3/1994 | LeRouzic et al. | 99/513 X |
| 5,433,144 | 7/1995 | Lee | 99/512 |
| 5,483,870 | 1/1996 | Anderson et al. | 99/510 |
| 5,551,335 | 9/1996 | McClean | 99/501 |
| 5,592,873 | 1/1997 | Lee | 99/513 X |

Primary Examiner—Timothy F. Simone
Attorney, Agent, or Firm—Alfred Lei

[57] ABSTRACT

A strainer assembly including a base formed at a central portion thereof with a rectangular projection having a cylindrical upper portion with external threads, the base having a plurality of holes, a cylindrical filter arranged on the base and having an open top, the cylindrical filter having an inner bottom formed with a plurality of protuberances around a periphery thereof and an outer bottom formed with a plurality of downwardly depending projections adapted to fit into the holes of the base, a circular cutter having a rectangular opening at a central portion thereof adapted to engage with the rectangular projection of the base and a plurality of recesses adapted to engage with the protuberances of the cylindrical filter, and a cap threadedly engaged with the external threads of the base.

1 Claim, 4 Drawing Sheets

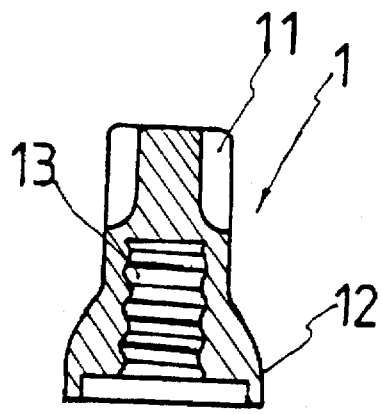
F I G. 2
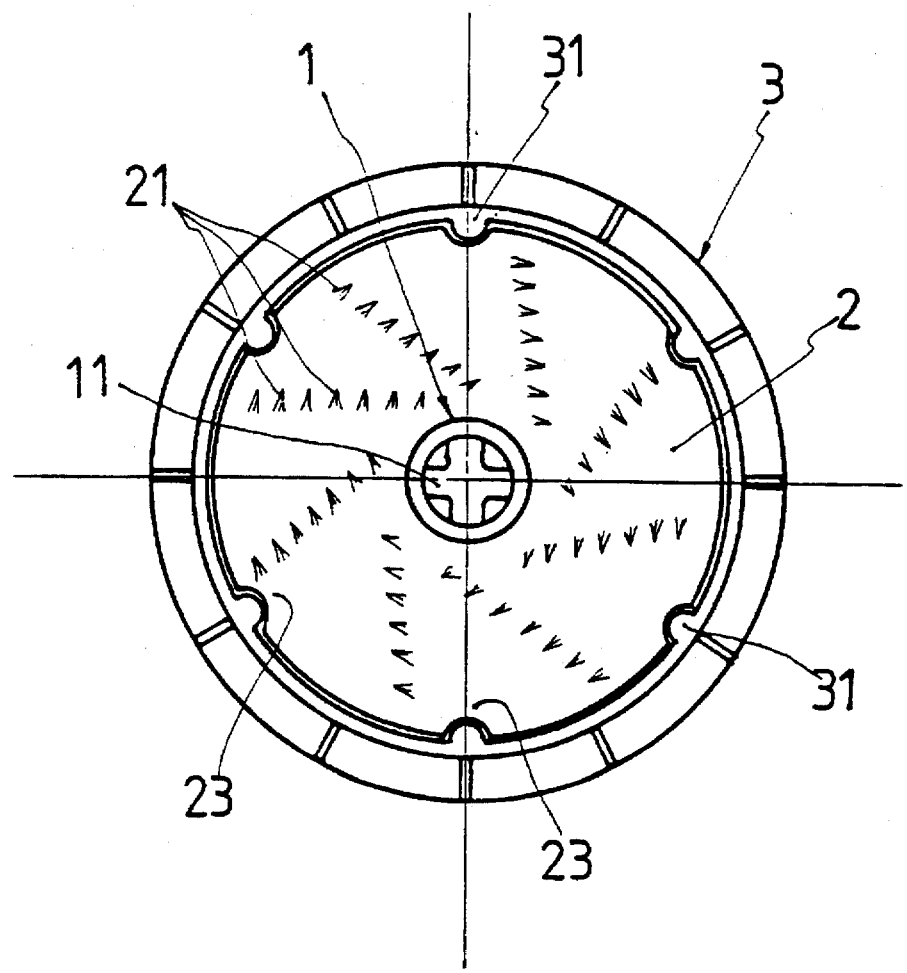
F I G. 3

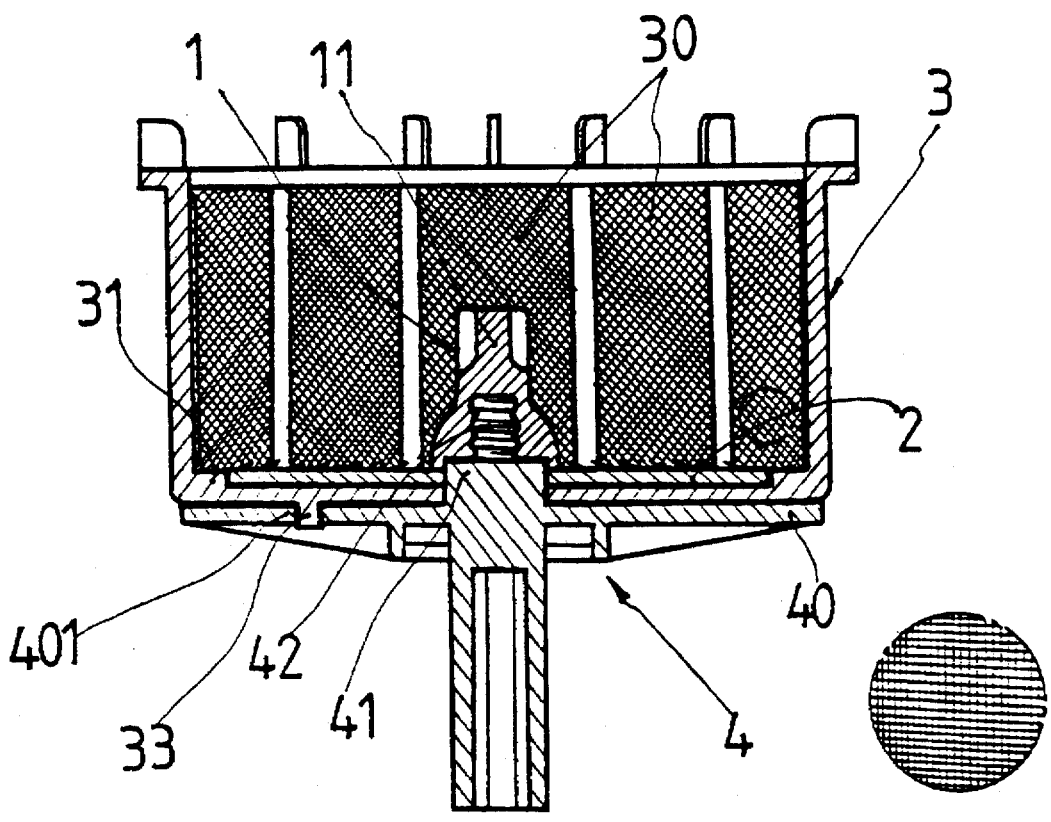
FIG. 4
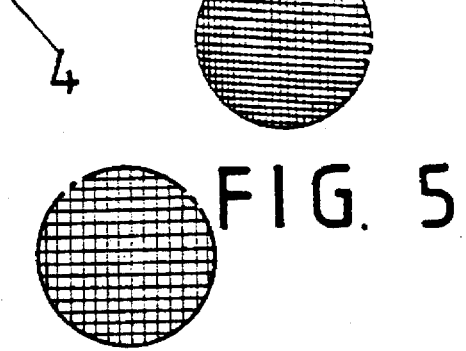
FIG. 5
FIG. 6

STRAINER ASSEMBLY

BACKGROUND OF THE INVENTION

1. Field of the Invention

This invention relates to an improved strainer assembly which can be easily dismantled.

2. Description of the Prior Art

As shown in FIG. 7, the conventional strainer assembly for a juicer includes a filter A2 in which is fixedly mounted a circular cutter A1. However, such a strainer assembly suffers from the following drawbacks:

1. The filter cannot be replaced with one with larger or smaller meshes thereby making it suitable for use with certain kinds of fruits only
2. It is hardly possible to clean the strainer assembly thoroughly.
3. As it is very difficult to clean the strainer assembly thoroughly, the sanitary condition of the strainer will be worrying.

Therefore, it is an object of the present invention to provide a strainer assembly which can obviate and mitigate the above-mentioned drawbacks.

SUMMARY OF THE INVENTION

This invention is related to an improved strainer assembly.

It is the primary object of the present invention to provide an improved strainer assembly wherein the cutter can be easily disengaged from the filter.

It is another object of the present invention to provide an improved strainer assembly which is convenient to be cleaned thoroughly.

It is still another object of the present invention to provide an improved strainer assembly having a filter which can be replaced with one with larger or smaller meshes.

It is still another object of the present invention to provide an improved strainer assembly which can be easily kept in sanitary condition.

It is a further object of the present invention to provide an improved strainer assembly which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

The invention is further described hereafter, by way of example only, with reference to the accompanying drawings, in which:

FIG. 2 is sectional view of the knob;

FIG. 3 is a top plan view of the strainer assembly;

FIG. 4 is a sectional view of the strainer assembly;

FIG. 5 illustrates a filter with smaller meshes;

FIG. 6 illustrates a filter with larger meshes; and

DETAILED DESCRIPTION OF THE PREFERRED EMBODIMENT

Figure 1:
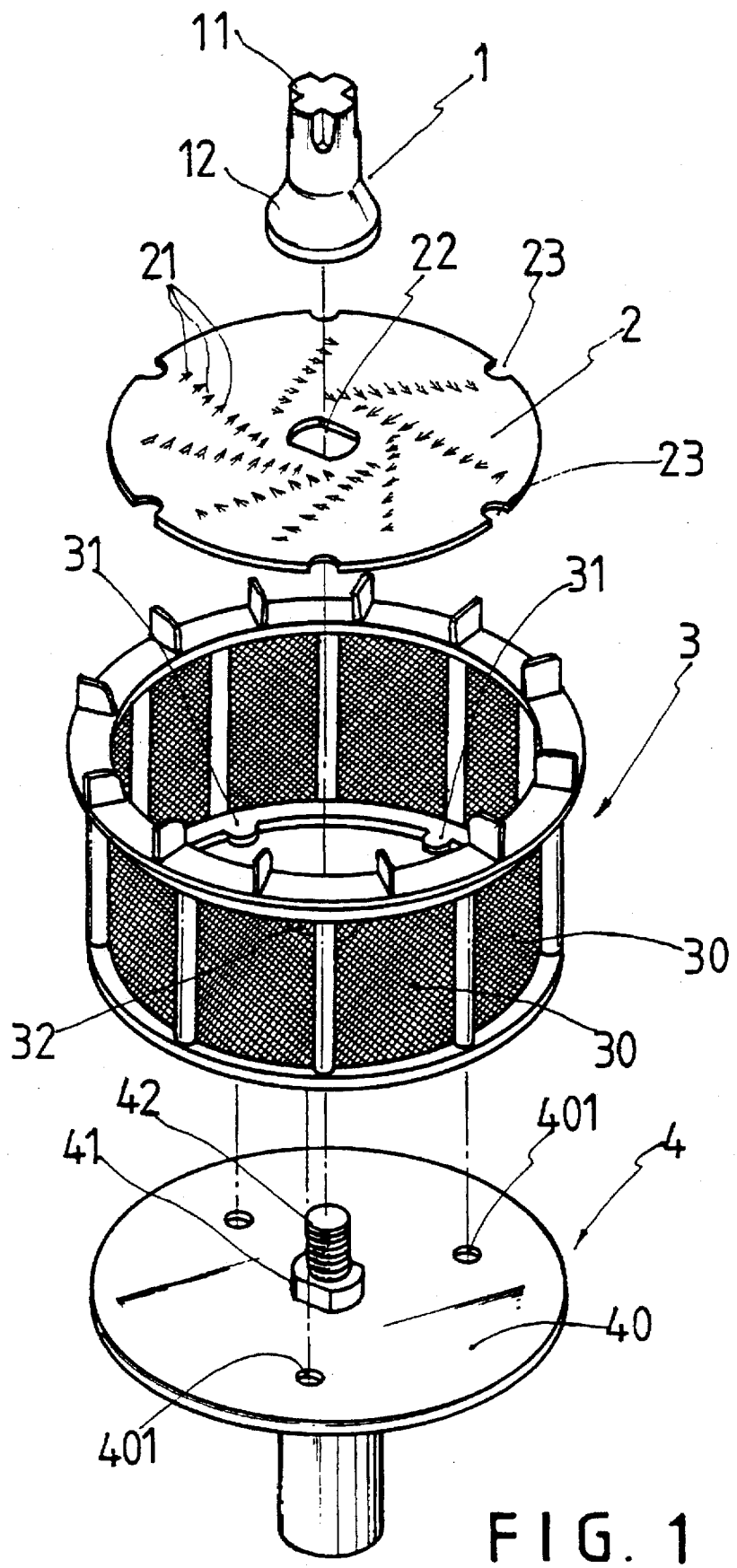
FIG. 1 is an exploded view of a strainer assembly according to the present invention.
Figure 7:
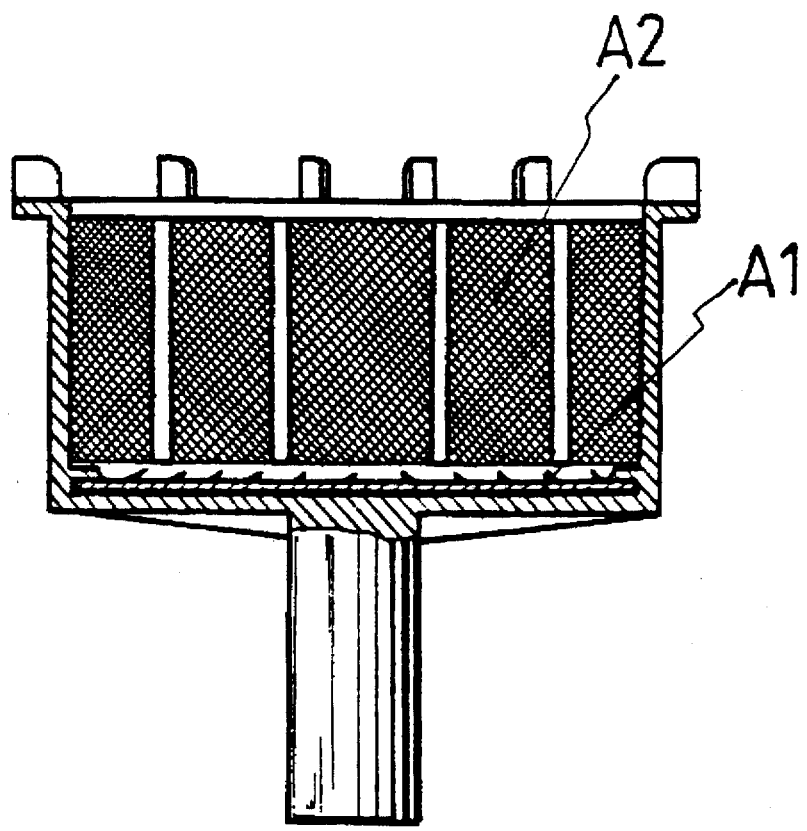
FIG. 7 is a sectional view of a prior art strainer assembly.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIGS. 1, 3 and 4, the strainer assembly according to the present invention mainly comprises a cap 1, a circular cutter 2, a cylindrical filter 3 and a base 4.

The base 4 is a circular disk 40 formed at the central portion with a rectangular projection 41 having a cylindrical upper portion with external threads 42. Further, the base 4 has a plurality of holes 401.

The cylindrical filter 3 is arranged on the base 4 and has an open top, a network 30 provided with a plurality of meshes 30, and a rectangular opening 32 at the central portion adapted to receive the rectangular projection 41 of the base 4. Further, the cylindrical filter 3 has an inner bottom formed with a plurality of protuberances 31 around its periphery and an outer bottom formed with a plurality of downwardly depending projections 33 adapted to fit into the holes 401 of the base 4.

The circular cutter 2 is provided with a plurality of knife edges 21 thereon and has a rectangular opening 22 at a central portion thereof adapted to engage with the rectangular projection 41 of the base 4 and a plurality of recesses 23 adapted to engage with the protuberances 31 of the cylindrical filter 3.

As shown in FIG. 2, the cap 1 has an upper end 11 formed with a plurality of longitudinal webs 11 for making it easier to be held and a conical lower end 12 formed with an internally threaded hole 13 at the bottom adapted to threadedly engage with the external threads 42 of the base 4.

Hence, the cylindrical filter 3 can be easily disengaged from the base 4 and replaced with one with larger or smaller meshes (see FIGS. 5 and 6).

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A strainer assembly comprising:

a base formed at a central portion thereof with a rectangular projection having a cylindrical upper portion with external threads, said base having a plurality of holes;

a cylindrical filter arranged on said base and having an open top and a rectangular opening adapted to receive said rectangular projection, said cylindrical filter having an inner bottom formed with a plurality of protuberances around a periphery thereof and an outer bottom formed with a plurality of downwardly depending projections adapted to fit into said holes of said base;

a circular cutter having a rectangular opening at a central portion thereof adapted to engage with said rectangular projection of said base and a plurality of recesses adapted to engage with said protuberances of said cylindrical filter; and a cap threadedly engaged with said external threads of said base.

* * * * *